United States Patent [19]

Ellis et al.

[11] Patent Number: 4,980,010
[45] Date of Patent: Dec. 25, 1990

[54] ADHESIVE BONDING OF STRUCTURES

[75] Inventors: Richard K. Ellis; Duncan R. Finch, both of Balderstone, United Kingdom

[73] Assignee: British Aerospace plc, London, United Kingdom

[21] Appl. No.: 469,243

[22] Filed: Jan. 24, 1990

[30] Foreign Application Priority Data

Jan. 26, 1989 [GB] United Kingdom ............... 8901742

[51] Int. Cl.$^5$ .............................................. B32B 31/00
[52] U.S. Cl. ................................... 156/292; 156/381; 156/499; 269/8; 269/276
[58] Field of Search ................ 156/272.4, 292, 580.1, 156/499, 381; 269/8, 276; 24/DIG. 11; 100/917, 264, 35; 335/285; 428/900; 248/683

[56] References Cited

U.S. PATENT DOCUMENTS

| | | | |
|---|---|---|---|
| 2,371,847 | 3/1945 | Saunders et al. | 156/292 X |
| 2,713,379 | 7/1955 | Sisson | 100/917 X |
| 2,770,958 | 11/1956 | Carew | 335/285 |
| 3,193,434 | 7/1965 | Weiss | 156/292 X |
| 3,711,929 | 1/1973 | Blakey et al. | 269/8 X |
| 3,879,247 | 4/1975 | Dickey . | |

FOREIGN PATENT DOCUMENTS 586978 4/1947 United Kingdom .

Primary Examiner—Michael W. Ball
Assistant Examiner—Mark A. Osele
Attorney, Agent, or Firm—Kerkam, Stowell, Kondracki & Clarke

[57] ABSTRACT

A method of forming composite articles from components (12, 14, 16) is described in which the components are joined by adhesive at their interfaces (18). The components have cavities (22) and the adhesive is compressed while it sets by placing magnetically attractable particulate material (20) into the cavities on one side of the interface and placing magnets (26) on the other side of the interface so that the attraction between the magnets and the particulate material compresses the adhesive. The particulate material may be removed from the cavities after the adhesive has set through apertures (24).

16 Claims, 2 Drawing Sheets

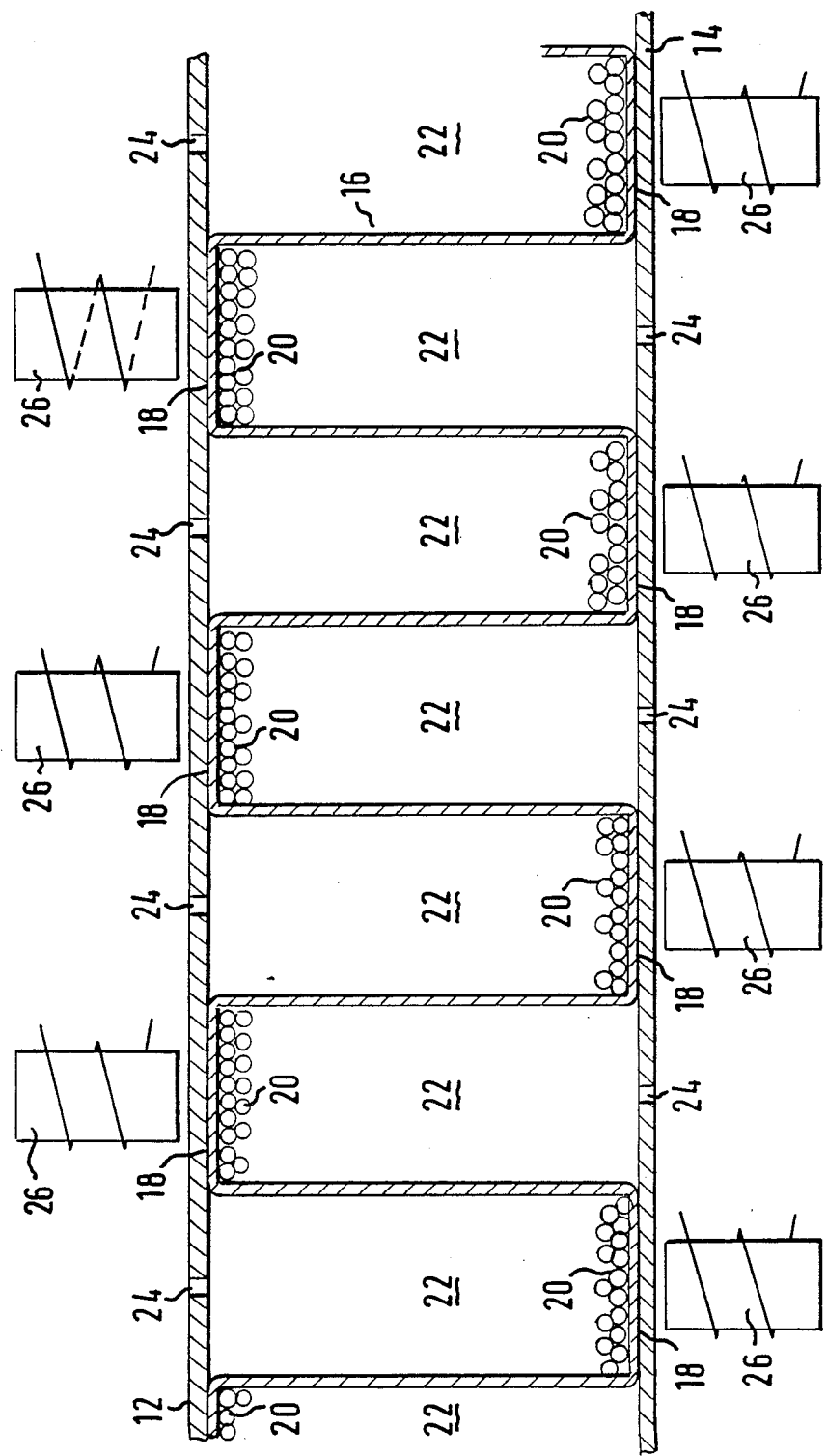

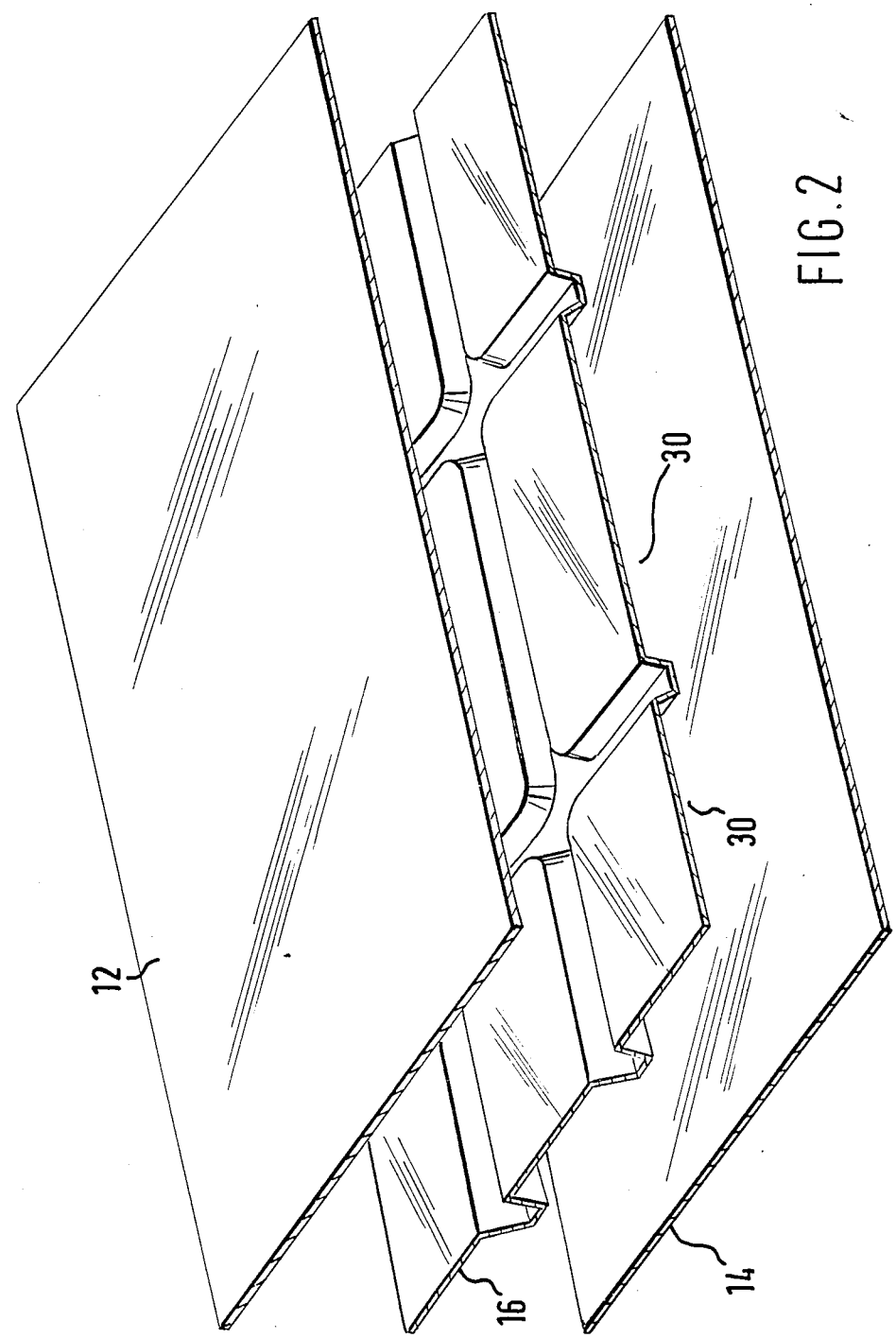

ADHESIVE BONDING OF STRUCTURES

FIELD OF THE INVENTION

The present invention relates to the bonding of components to make a composite structure and it especially relates to the bonding of aluminum and aluminum alloys for use in the aircraft industry.

BACKGROUND ART

Aircraft designers are constantly searching for ways of connecting components together to produce a strong bond while using a minimum of additional material to form the bond in order to keep the weight of the aircraft structure as low as possible. One proposal has been to bond components together using an adhesive and this has proved successful but requires the bond to be compressed while the adhesive sets. When the bonded region is readily accessible, the components can simply be compressed by means of a clamp applied to the bonded region; however, when the bonded region is, not accessible, for example because one of the components has an enclosed cavity above the bonded area so that clamps cannot reach the bonded area, the two components must be held in a press to urge the two components together while the adhesive sets. However, not only is it impractical to place large structures in a press but also, since pressure in the press is applied to the whole structure, the pressure can deform parts that are not being bonded and to avoid this it is often necessary to support such parts while the components are in the press. The provision of supports is time-consuming and in many cases the structure being bonded precludes the use of removable internal supports, for example when it is desired to bond two components together to form an enclosed cavity; in the latter case, the support could be built into the enclosed space but this increases the weight of the resulting structure and defeats the primary object of adhesive bonding. The setting of the adhesive can often be accelerated by heat and to achieve simultaneous heating and compression of the adhesive the structure can be placed in an autoclave; however, large autoclaves are expensive.

U.S. Pat. No. 3,879,247 describes a method of sealing packages by incorporating a magnetically susceptible strip in one flap of the package, placing a second flap over the first with a layer of adhesive between them, placing a magnetic coil against the second flap to attract the strip in the first flap and hold the two flaps together while the adhesive is setting. However, the incorporation of magnetically susceptible strips is disadvantageous, particularly in aircraft where they would add to the weight of the structure and where they could affect the working of instruments.

GB No. 586,978 describes a method of bonding articles together by placing a magnet on one side of an assembly to which adhesive has been applied and an armature on another, so that the adhesive is compressed by the magnetic attraction between the magnet and the armature while it is setting but such an arrangement does not allow the joining of components having enclosed cavities therein.

DISCLOSURE OF THE INVENTION

We have now developed a new technique for compressing adhesive bonds while they set.

According to the present invention, there is provided a method of making a composite article having an enclosed internal hollow cavity therein by joining a first component having said cavity formed therein and a second component by means of adhesive applied to an interface between the first and the second components, wherein the cavity is defined by at least one wall which forms at least part of the said interface and wherein the first and the second components are magnetically non-susceptible, the method comprising:

applying adhesive between the said first and the second components at the said interface, compressing the adhesive while it sets by means of the magnetic attraction between particulate magnetically attractable material located in the said cavity and a magnet located on the side of the second component remote from the cavity, and removing the particulate material through an aperture in the cavity when the adhesive has set.

The present invention is primarily directed to bonding components made of aluminum or aluminum alloys in fabricating parts for aircraft.

The magnet may be a permanent magnet or an electromagnet. The magnetically attractable material could be small permanently magnetic or ferromagnetic particles, such as small ball bearings, that can be removed from the hollow cavity after bonding by drawing them through the small aperture formed in the structure, the aperture being small enough not to reduce the strength of the composite structure. If required the aperture could be closed after removal of the particulate material.

In the method of the present invention, only those parts of a structure are compressed that are being bonded and thus there is no need to support the remaining parts of the structure. The present invention also removes the necessity of using an autoclave to apply heat and pressure to the adhesive while it sets; thus, according to the present invention, the structure can be heated in a simple oven during bonding, thereby considerably reducing tooling costs.

Needless to say, the magnets used in the present invention must be capable of withstanding the temperatures encountered during heating of the adhesive and they should impart a sufficient compressive force on the bond to ensure that the components are adequately bonded together.

DESCRIPTION OF THE DRAWINGS

The bonding method of the present invention is shown schematically by way of example in the attached drawings in which:

FIG. 1 is a sectional view through a panel during bonding, and

FIG. 2 is an exploded orthogonal view of a sandwich panel suitable for use in the present invention.

DETAILED DESCRIPTION OF THE PREFERRED EMBODIMENT

Two outer aluminum face sheets 12 and 14 are to be bonded to opposed sides of a corrugated aluminum core 16 by means of adhesive (Redux 319A) located at interfaces 18 between the peaks/troughs of the core 16 and the adjacent parts of the sheets 12, 14 to form a composite panel. Ferromagnetic steel ball bearings 20 are passed through apertures 24 in the sheets 12, 14 into each hollow cavity 22 formed by the sheets and core. Electromagnets 26 are placed against the outside of the sheets opposite to the adhesive at 18 and, when energized, attract the ball bearings thereby compressing the adhesive between core 16 and sheets 10 and 12. The structure is then placed in an air circulating oven until the adhesive has set. The electromagnets are then de-energized and the ball bearings 20 are removed from cavities 22 through apertures 24. The removal of the ball bearings may be assisted by a magnet (not shown) located opposite the apertures and by inverting the panel. The apertures 24 should be sufficiently small to avoid having an adverse effect on the strength of the structure and they can subsequently be covered over.

The corrugated core strip is preferably waffle-shaped so that the individual peaks and/or troughs of the corrugations are formed as isolated cells 30 (see FIG. 2).

What is claimed is:

1. A method of making a composite article having an internal hollow cavity therein by joining a first component having said cavity formed therein and a second component by means of adhesive applied to an interface between the first and the second components, wherein the cavity is defined by at least one wall which forms at least part of the said interface and wherein the first and the second components are magnetically non-susceptible, the method comprising:
   providing particulate magnetically attractable material in the said cavity,
   applying adhesive between the said first and the second components at the said interface,
   compressing the adhesive while it sets by means of the magnetic attraction between particulate magnetically attractable material located in the said cavity and a magnet located on the side of the second component remote from the cavity, and
   removing the particulate material through an aperture in the cavity, remote from the interface, when the adhesive has set.

2. A method as claimed in claim 1, wherein the first component is made of at least a first part and a second part that together define the said cavity.

3. A method as claimed in claim 2, wherein the said first part is a corrugated member and the second part is a face sheet.

4. A method as claimed in claim 3, wherein the second component is a face sheet.

5. A method as claimed in claim 3, wherein the corrugated member includes peaks and troughs and wherein at least the peaks are formed as isolated cells.

6. A method as claimed in claim 3, wherein the corrugated member includes peaks and troughs and wherein at least the troughs are formed as isolated cells.

7. A method as claimed in claim 1, wherein the second component is a face sheet.

8. A method as claimed in claim 1, wherein the first and second components are made from a material selected from aluminum and aluminum alloys.

9. A method as claimed in claim 1, wherein the particulate magnetically attractable material is formed of ball bearings.

10. A method as claimed in claim 1, wherein the structure is heated in an oven while the adhesive sets.

11. A method of forming a structure comprising a first and a second face sheet that are opposed to each other and a corrugated core sandwiched between the face sheets, the core having peaks that abut the first said face sheet and troughs that abut the second said face sheet, whereby cavities are formed beneath the peaks between the peaks and the second face sheet and cavities are formed above the troughs between the troughs and the first face sheet, which method comprises:
   applying adhesive between the first face sheet and the peaks of the core and between the second face sheet and the troughs of the core,
   assembling the structure by placing the first core sheet against the peaks of the core and the second face sheet against the troughs of the core whereby the said cavities are formed between the peaks and the second face sheet and between the troughs and the first face sheet,
   compressing the adhesive between the core and the first face sheet while it sets by means of magnetic attraction between a magnetically attractable particulate material located in the said cavities beneath the said peaks and one or more magnets located on the side of the first face sheet remote from the magnetically attractable material,
   compressing the adhesive between the core and the second face sheet while it sets by means of magnetic attraction between magnetically attractable particulate material located in the said cavities above the troughs and one or more magnets located on the side of the second face sheet remote from the magnetically attractable material, and
   removing the magnetically attractable particulate material from each of the said cavities beneath the peaks through an aperture in the second sheet communicating with the cavity and removing the magnetically attractable particulate material from each of the said cavities above the troughs through an aperture in the first sheet communicating with the cavity.

12. A method as claimed in claim 11, wherein the first and second face sheets and the core are made from a material selected from aluminum and aluminum alloys.

13. A method as claimed in claim 11, wherein the particulate magnetically attractable material is formed of ball bearings.

14. A method as claimed in claim 11, wherein the structure is heated in an oven while the adhesive sets.

15. A method as claimed in claim 11, wherein at least the peaks of the core are formed as isolated cells.

16. A method as claimed in claim 11, wherein at least the troughs of the core are formed as isolated cells.

* * * * *